(12) United States Patent
Bosio

(10) Patent No.: US 9,174,228 B2
(45) Date of Patent: Nov. 3, 2015

(54) KITCHEN SINK SPRAYER

(71) Applicant: AMFAG S.P.A., Casaloldo (IT)

(72) Inventor: Orlando Bosio, Casaloldo (IT)

(73) Assignee: AMFAG S.P.A., Casaloldo (IT)

( * ) Notice: Subject to any disclaimer, the term of this patent is extended or adjusted under 35 U.S.C. 154(b) by 0 days.

(21) Appl. No.: 14/140,182

(22) Filed: Dec. 24, 2013

(65) Prior Publication Data

US 2014/0109311 A1 Apr. 24, 2014

Related U.S. Application Data

(63) Continuation of application No. 13/097,582, filed on Apr. 29, 2011, now Pat. No. 8,727,241.

(30) Foreign Application Priority Data

May 5, 2010 (IT) .................................. MI10A0785

(51) Int. Cl.
*B05B 7/02* (2006.01)
*B05B 1/30* (2006.01)
(Continued)

(52) U.S. Cl.
CPC ................ *B05B 1/3013* (2013.01); *B05B 1/02* (2013.01); *B05B 1/1618* (2013.01);
(Continued)

(58) Field of Classification Search
CPC .. B05B 1/1618; B05B 1/3013; B05B 12/002; B05B 15/066; B05B 1/1636; B05B 1/3046; B05B 1/18; B05B 1/02; B05B 1/3026; B05B 15/061; B05B 9/01; B05B 1/1627; E03C 1/0404; E03C 1/0405; E03C 2001/0415; F16L 27/12

USPC ......... 239/443, 446–449, 525, 526, 530, 569, 239/583, 587.1, 588, 600; 4/675, 677, 678; 137/801; 285/302
See application file for complete search history.

(56) References Cited

U.S. PATENT DOCUMENTS 5,546,978 A * 8/1996 Parker ........................... 137/801
5,934,325 A * 8/1999 Brattoli et al. ................. 239/588
(Continued)

FOREIGN PATENT DOCUMENTS

EP          1 825 919       8/2007
WO     WO 2006/094424      9/2006

OTHER PUBLICATIONS

Italian Search Report, issued Jan. 21, 2011 for Italian Application No. MI2010A000785.

*Primary Examiner* — Steven J Ganey
(74) *Attorney, Agent, or Firm* — Pearl Cohen Zedek Latzer Baratz LLP

(57) ABSTRACT

A kitchen sink sprayer, comprising a body enclosed in an outer enclosure for being gripped and provided with a coupling to a flexible water supply hose connected to a faucet for adjusting the flow-rate between a closed position and an open position, the body comprising a rod which has, at one end, a tip that is adapted to open selectively the access of the water to a duct for forming a central jet and to ducts for forming a peripheral jet, and is provided with means for actuation by the user, the means for actuating the rod having a tab which is connected directly to the rod in an intermediate position of the rod and protrudes from the enclosure of the sprayer, at its lateral surface, by an extent that is sufficient for contact grip by the user when it is necessary to actuate the rod in order to move it from one of its selection positions to the other and vice versa.

20 Claims, 4 Drawing Sheets

(51) Int. Cl.
*B05B 1/02* (2006.01)
*B05B 15/06* (2006.01)
*B05B 9/01* (2006.01)
*F16L 27/12* (2006.01)
*B05B 1/16* (2006.01)
*B05B 12/00* (2006.01)
*E03C 1/04* (2006.01)
*B05B 1/18* (2006.01)

(52) U.S. Cl.
CPC ............ *B05B 1/1636* (2013.01); *B05B 1/3026* (2013.01); *B05B 1/3046* (2013.01); *B05B 9/01* (2013.01); *B05B 12/002* (2013.01); *B05B 15/061* (2013.01); *B05B 15/066* (2013.01); *E03C 1/0404* (2013.01); *E03C 1/0405* (2013.01); *F16L 27/12* (2013.01); *B05B 1/18* (2013.01); *E03C 2001/0415* (2013.01)

(56) References Cited

U.S. PATENT DOCUMENTS

| | | | |
|---|---|---|---|
| 6,619,567 | B1 | 9/2003 | Ouyoung |
| 7,000,854 | B2 | 2/2006 | Malek et al. |
| 7,331,536 | B1 * | 2/2008 | Zhen et al. .................... 239/449 |
| 7,344,095 | B1 | 3/2008 | Hsu |
| 7,607,588 | B2 | 10/2009 | Nobili |
| 7,871,020 | B2 | 1/2011 | Nelson et al. |
| 8,727,241 | B2 * | 5/2014 | Bosio .......................... 239/525 |
| 2005/0189438 | A1 | 9/2005 | Bosio |
| 2007/0018019 | A1 | 1/2007 | Nobili |
| 2007/0200014 | A1 | 8/2007 | Nobili |
| 2008/0067264 | A1 | 3/2008 | Erickson et al. |
| 2008/0302886 | A1 | 12/2008 | Hodel et al. |

* cited by examiner

KITCHEN SINK SPRAYER

CROSS-REFERENCE TO RELATED APPLICATIONS

This application is a continuation of U.S. patent application Ser. No. 13/097,582, filed Apr. 29, 2011, which claims the benefit of Italian Patent Application No. MI2010A000785, filed May 5, 2010 and hereby incorporated by reference herein.

BACKGROUND OF THE INVENTION

The invention relates to a kitchen sink sprayer.

It is known that many kitchen sinks are provided with faucets for supplying water and for adjusting the flow of the water between full open and closed positions, which comprise, accommodated in an adapted duct, a flexible hose that extends at one end from said faucet and is provided, at the other end, with an element known as a sprayer, which is designed to be gripped by the user in order to achieve two goals.

First of all, the sprayer can be managed in order to make the flow of water exit in different positions within the sink, and furthermore the sprayer can be required, by way of a simple actuation of means with which it is provided, to determine the outflow of the water in the form of a central jet or of a peripheral jet.

The sprayer comprises a body which is enclosed in an outer enclosure for being gripped by the user and is provided with a coupling to the flexible water supply hose, and such body comprises a rod provided, at one end, with a tip that is adapted to open selectively the access of the water to ducts for forming the central jet and to ducts for forming the peripheral jet, and is provided with actuation means that allow the user to move it from one of the two selection positions to the other and vice versa.

The rod actuation means that are known in the background art have all a certain constructive complexity and a consequent rather substantial space occupation, which in any case is such as to constitute a crucial obstacle in the process of sprayer miniaturization that today is an essential condition for the commercial success thereof.

SUMMARY OF THE INVENTION

The aim of the present invention is to provide a sprayer in which the rod actuation means have a space occupation reduced to a minimum, so as to allow maximum miniaturization of the sprayer.

This aim is achieved by a kitchen sink sprayer according to the invention, characterized in that it comprises the features disclosed in the appended claims.

BRIEF DESCRIPTION OF THE DRAWINGS

Further characteristics and advantages will become better apparent from the description of a preferred but not exclusive embodiment of the kitchen sink sprayer according to the invention, illustrated by way of non-limiting example in the accompanying drawings, wherein.

DETAILED DESCRIPTION OF THE INVENTION

Figure 1:
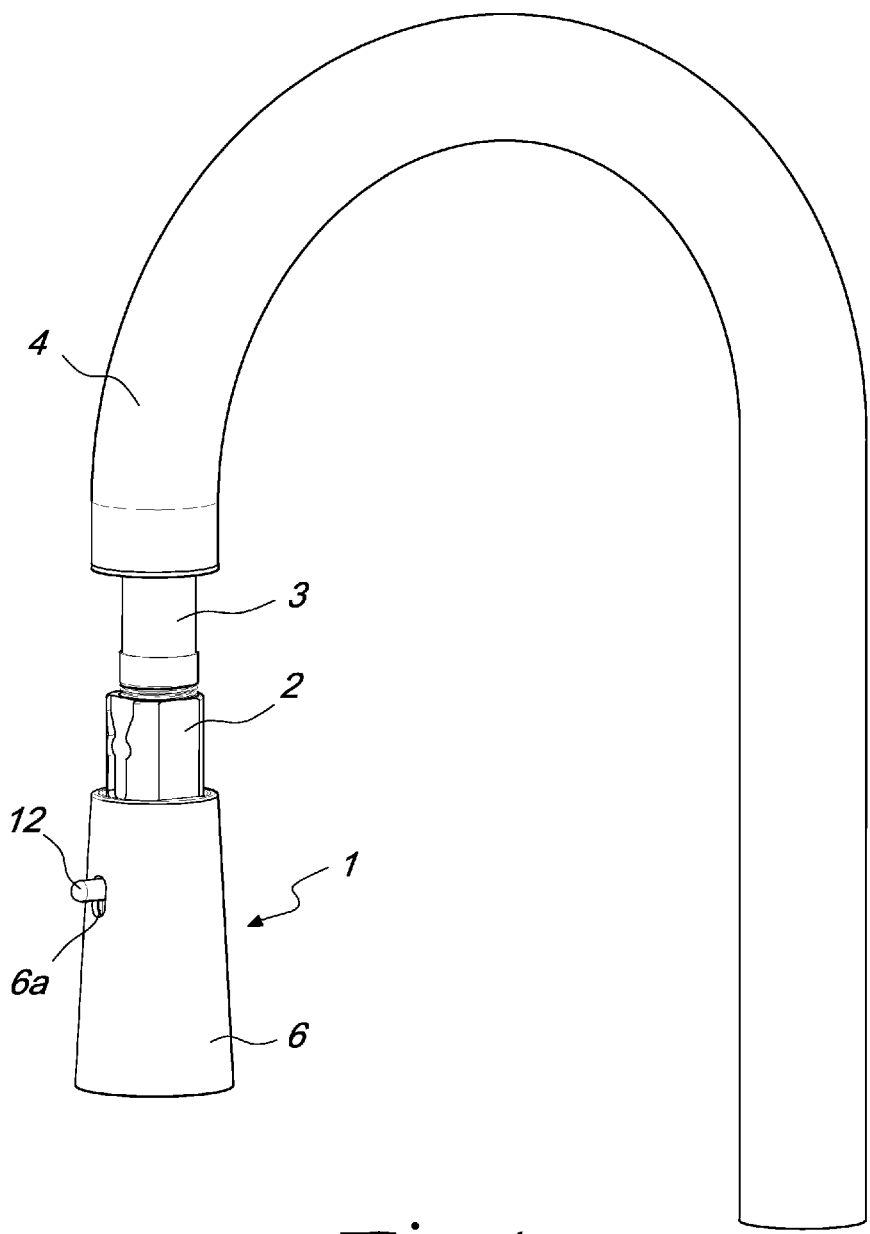
FIG. 1 is a perspective view of a sprayer of the invention connected to one end of the flexible hose accommodated in the adapted duct that extends from a faucet, not shown in the figure.

With reference to the figures, the reference numeral 1 generally designates a sprayer, connected by means of a coupling 2 to one end of a flexible hose 3 that is accommodated in an adapted duct 4 and extends at the other end from a faucet, which is not shown in the figures, and adjusts the flow-rate of the water between the two extreme positions of being fully open and fully closed.

The sprayer 1 comprises a body 5, which is held in position in an outer enclosure 6 for being gripped by the user, together with the coupling 2, by a plug 7, which comprises at least one duct 8 provided with an aerator 9 for providing the outflow of the water in the form of a central jet, and at least one and preferably two ducts 10a, 10b for forming a peripheral jet.

Figure 2:
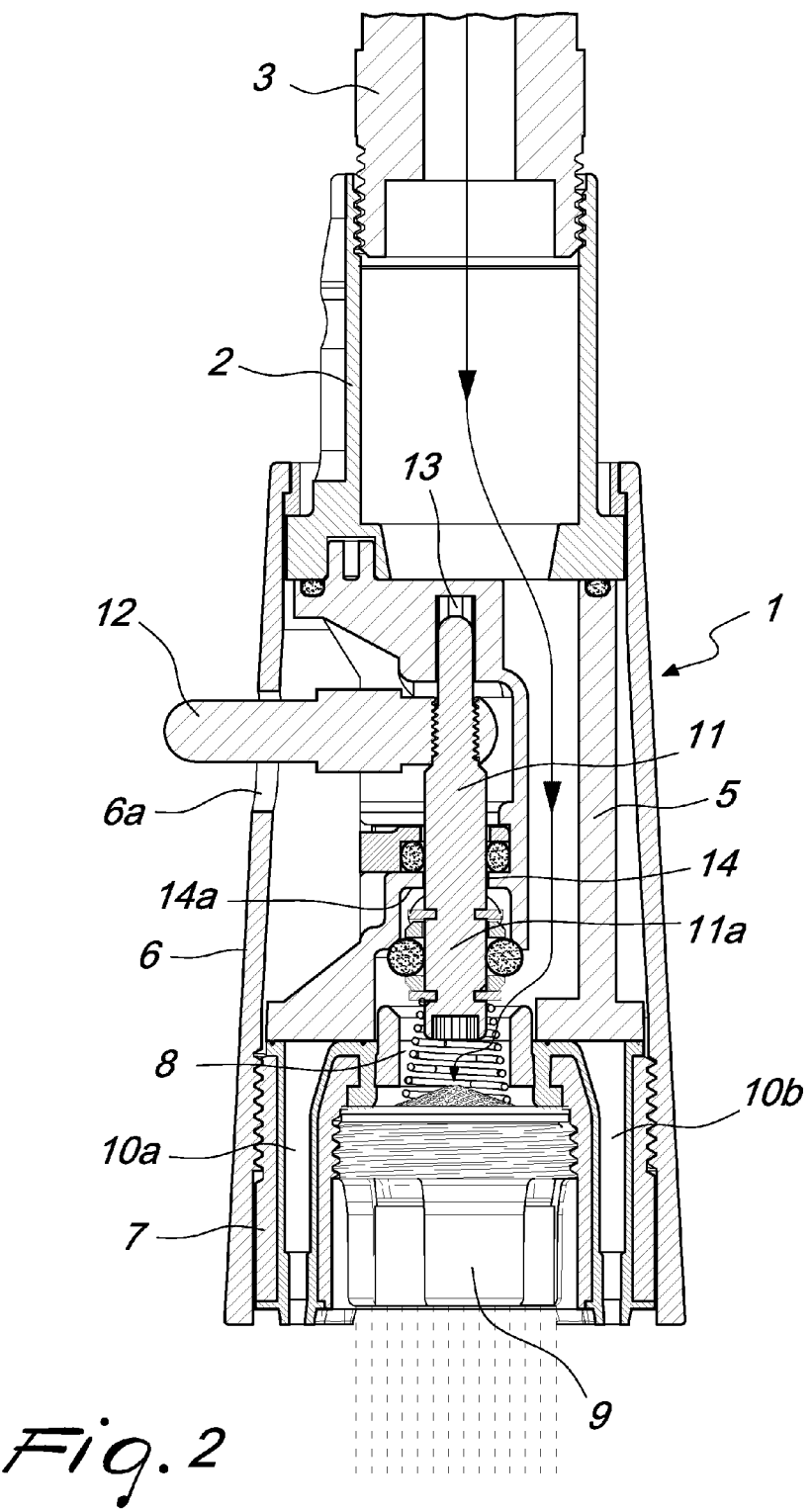
FIGS. 2 and 3 are sectional views of the sprayer respectively in the central jet condition and in the peripheral jet condition.
Figure 3:
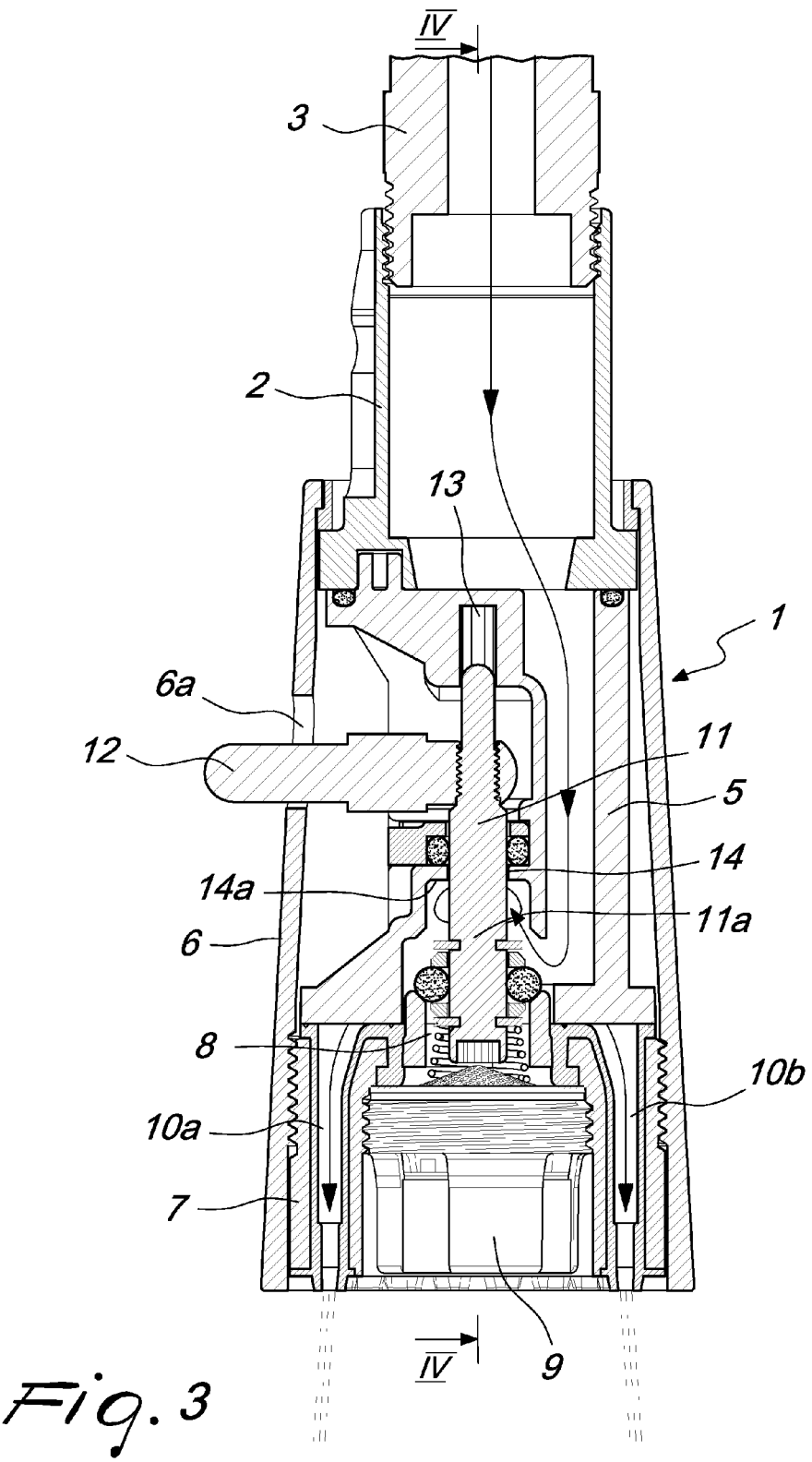
Figure 4:
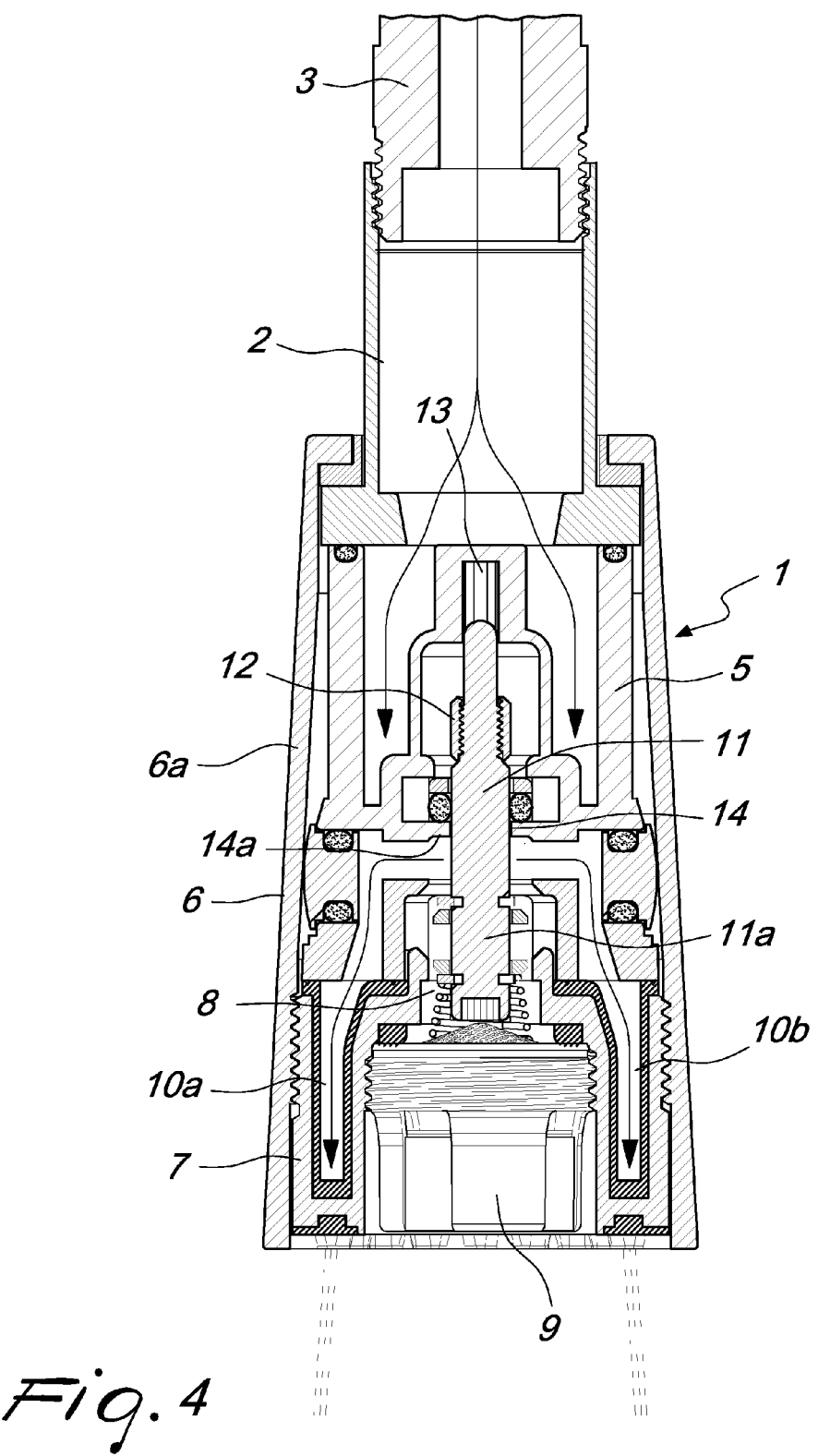
FIG. 4 is a sectional view taken along the line IV-IV of FIG. 3.

Within the body 5 a rod 11 is provided, which has a tip 11a that is adapted to assume, as a consequence of the actuation applied by the user on the rod 11, the two positions shown respectively in FIGS. 2 and 3, so as to open selectively the access of water, shown by means of arrows in the figures, to the duct 8 for providing a central jet, as in FIG. 2, and to the ducts 10a, 10b for providing a peripheral jet, as in FIG. 3.

An important feature of the invention resides in that the means for the actuation of the rod 11 comprise a tab 12, which is connected directly thereto by means of a thread and protrudes from the outer enclosure 6 through a slot 6a by an extent that is sufficient for contact grip by the user when it is necessary to actuate the rod 11 to move it from one of its selection positions to the other and vice versa.

The rod 11 is guided in its movements by guiding means which are constituted by a seat 13 that accommodates the upper end of the rod, and by the walls of a hole 14 provided in a ridge 14a, said guiding means being arranged on opposite sides with respect to the coupling position of the tab 12, so as to offer maximum effectiveness.

The extreme simplicity of the actuation means of the rod 11 that are present in the invention is evident from what has been described; this makes it possible to reduce the space occupation of the sprayer to levels that would be impossible by adopting means of the type proposed by the background art.

In fact, it is sufficient to consider, merely by way of example, that by adopting a conical outer enclosure 6 such as the one shown in the figures it is possible to provide a sprayer which, starting from a diameter of 28 mm at the base, blends without discontinuities with a duct 14, which has a diameter equal to 24 mm, such dimensions being unattainable without the adoption of the means proposed by the invention.

The described invention is susceptible of numerous modifications and variations, all of which are within the scope of the inventive concept: the tab 12 can be, for jointly connected to the rod 11 in any manner, and the sprayer can comprise, in a known manner, a spring which automatically determines the return to the central jet position from the peripheral jet position when the faucet is closed.

The invention claimed is:

1. A kitchen sink sprayer, comprising:
a body enclosed in an outer enclosure for being gripped by a user and provided with a coupling to a flexible water supply hose, which is adapted to be connected to a faucet for adjusting the flow-rate between a closed position and an open position;

said body comprising inside it a rod that has, at one end, a tip adapted to open selectively the access of the water to at least one duct for forming a central jet and to at least one duct for forming a peripheral jet, and is provided with an actuating element;

wherein said actuating element comprises a tab that is connected to said rod and protrudes from the outer enclosure of the sprayer, at the lateral surface thereof, by an extent that is sufficient for contact grip by the user when it is necessary to actuate said rod to move it from one of its selection positions to the other and vice versa;

wherein said coupling is structurally independent from the body and from the outer enclosure of the kitchen sink sprayer;

wherein a flange portion of said coupling is enclosed by said outer enclosure;

wherein said body, together with said coupling, is held in position in said outer enclosure by a plug, the plug being set against the body, which in turn is set against the flange portion of the coupling;

wherein said body is not directly constrained to said coupling against translation away from said coupling along a longitudinal axis of the sprayer, said body being simply supported by the plug, said plug being constrained to said outer enclosure against translation along the longitudinal axis of the sprayer, so that said plug restrains in a longitudinal position said body otherwise free to move away from the coupling within the outer enclosure.

2. The sprayer according to claim 1, wherein said body is sandwiched between the coupling and the plug, the coupling and the plug being independently connected by the outer enclosure.

3. The sprayer according to claim 2, wherein said plug is threadedly connected within said outer enclosure, so as to pack the body against the coupling.

4. The sprayer according to claim 1, wherein said coupling is removably attached to the rest of the kitchen sink sprayer.

5. The sprayer according to claim 1, wherein said coupling comprises at least a first feature meant to releasably fix the kitchen sink sprayer to a mouth of the faucet and at least a second feature meant to connect the kitchen sink sprayer to the flexible water supply hose.

6. The sprayer according to claim 5, wherein said coupling has a tubular structure, the first feature being provided on an external surface and the second feature being provided on an internal surface thereof.

7. The sprayer according to claim 6, wherein said second feature is a thread.

8. The sprayer according to claim 5, wherein said coupling is removably attached to the rest of the kitchen sink sprayer.

9. The sprayer according to claim 1, wherein said rod has a longitudinal axis, said rod being slidingly guided in said body in a sliding direction corresponding to said longitudinal axis of said rod, and said tab being movably guided exclusively in a single sliding direction that is parallel to the longitudinal axis.

10. The sprayer according to claim 1, wherein said tab is connected to said rod in an intermediate position of said rod, said sprayer further comprising a guide for guiding the rod in its motion, which is arranged on opposite sides with respect to the coupling position of the tab on said rod.

11. The sprayer according to claim 10, wherein said guide comprises an upper seat arranged in the body, slidingly housing an upper end of the rod.

12. The sprayer according to claim 10, wherein said guide comprises walls of a hole made in an internal partition of the body, wherein the rod is slidingly received.

13. The sprayer according to claim 10, wherein said guide comprises an upper seat arranged in the body, slidingly housing an upper end of the rod, as well as walls of a hole made in an internal partition of the body, wherein the rod is slidingly received.

14. The sprayer according to claim 1, wherein the tab of the rod protrudes from the outer enclosure of the sprayer in a direction perpendicular to said longitudinal axis of said rod at a slot provided on said enclosure.

15. The sprayer according to claim 14, wherein the tab of the rod is solidly attached to the rod by threading.

16. The sprayer according to claim 1, wherein the tab of the rod is solidly attached to the rod.

17. The sprayer according to claim 1, wherein said coupling and said body comprise first and second mating elements, eccentric with respect to the longitudinal axis of the sprayer, that prevent a relative rotation between the coupling and the body about the longitudinal axis.

18. The sprayer according to claim 17, wherein said first and second mating elements are a tooth and respective recess, respectively, or are a recess and a tooth, respectively.

19. The sprayer according to claim 17, wherein said coupling has a tubular structure, wherein an external surface of said tubular structure is provided with at least one non-cylindrical portion that prevents a rotation of the coupling with respect to the outer enclosure.

20. The sprayer according to claim 1, further comprising a ring placed between the coupling and the outer enclosure.

\* \* \* \* \*